United States Patent [19]
Abendschein et al.

[11] Patent Number: 6,004,043
[45] Date of Patent: Dec. 21, 1999

[54] SHUTTERED CONNECTOR RECEPTACLE

[75] Inventors: Frederic Henry Abendschein, Columbia; Robert Carl Briggs, Newport; Donald Keith Harper, Jr., Harrisburg, all of Pa.

[73] Assignee: The Whitaker Corporation, Wilmington, Del.

[21] Appl. No.: 09/062,532

[22] Filed: Apr. 17, 1998

Related U.S. Application Data

[60] Provisional application No. 60/068,333, Dec. 19, 1997.

[51] Int. Cl.[6] .................................................. G02B 6/36
[52] U.S. Cl. ............................................................ 385/76
[58] Field of Search ................................ 385/53, 54, 55, 385/70, 71, 72, 73, 75, 76, 147

[56] References Cited

U.S. PATENT DOCUMENTS

| | | | |
|---|---|---|---|
| 4,687,291 | 8/1987 | Shape et al. | 350/96.21 |
| 4,779,950 | 10/1988 | Williams | 350/96.21 |
| 5,363,460 | 11/1994 | Marazzi et al. | 385/70 |
| 5,506,922 | 4/1996 | Grois et al. | 385/75 |

FOREIGN PATENT DOCUMENTS

0729048 B1  1/1996  European Pat. Off. .......... G02B 6/38

*Primary Examiner*—Akm E. Ullah

[57] ABSTRACT

A receptacle for fiber optic cable connectors has a shutter which consists of an assembly of a plate and a spring adjacent one end of the plate, the assembly being positioned inside the receptacle's open end, the plate being inclined inwardly and deforming the spring so that it exerts an erecting force on the plate, and the assembly being too large for the plate to become fully erect.

24 Claims, 4 Drawing Sheets

SHUTTERED CONNECTOR RECEPTACLE

This application is a provisional application of 60/068,333 filed on Dec. 19, 1997.

BACKGROUND OF THE INVENTION

The present invention relates to connectors and more particularly to receptacles for fiber optic cable connectors.

FIELD OF THE INVENTION

Apparatus for connecting two fiber optic cables generally includes a receptacle within which a connector bearing the end of one of the two cables is pre-positioned. The connector which bears the end of the other cable is then inserted into this receptacle so as to establish the desired mating between the exposed ends of the two cables. In what follows, this second connector will be referred to as the "outside" connector, to distinguish it from the pre-positioned, or "inside" connector.

DESCRITPION OF THE PRIOR ART

It has been recognized that such a receptacle should have several important features. One is to provide protection from contamination for the exposed end of the cable borne by the prepositioned, or inside connector, while that cable is not mated to the cable in the outside connector. For such protection, it has been proposed to provide a lid, or shutter to close the open end of the receptacle, whenever the outside connector is not inserted. If a laser is used as the light source for the fiber optic cables, then such a closed shutter also protects the eyesight of persons in the vicinity. Also a light beam emitted from the cable in the inside connector should not be reflected straight back toward that cable by the inner face of the closed shutter. To that end, it has been proposed to install the shutter in the receptacle so that its inner face is inclined relative to this light beam. Finally, the shutter should open and close automatically in response to insertion and withdrawal of the outside connector. To that end, it has been proposed to apply spring bias to urge the shutter toward its closed position. This not only made possible one-handed operation for outside connector insertion, but it also prevented the shutter from remaining open when the outside connector is not inserted.

All of this still left room for substantial additional improvements in this technology.

SUMMARY OF THE INVENTION

In accordance with the present invention, a shutter for the open end of a receptacle for fiber optic cable connectors takes the form of an assembly of a plate and a resilient member, attached at one end of the plate. The construction is such that, when this assembly is inserted into the receptacle's open end, with the plate inclined toward the receptacle's interior, the resilient member becomes deformed so as to exert an erecting force on the plate. However, the plate is intentionally made too large to become fully erect. The plate therefore remains inclined inwardly, with its free end restrained from further movement toward the open end by abutting against the "ceiling" of the receptacle. The outermost ends of the resilient member are placed in frictional engagement with the receptacle, thereby holding the assembly in place inside the receptacle.

Thus, there is provided an extremely simple construction, which provides substantially all the features described above and which, moreover, is extremely simple to construct and use.

For further details, reference is made to the description which follows, taken in light of the accompanying drawings.

BRIEF DESCRIPTION OF THE DRAWINGS

The same reference numerals are used in the several figures to designate corresponding elements.

DETAILED DESCRIPTION OF THE PREFERRED EMBODIMENTS

Figure 1:
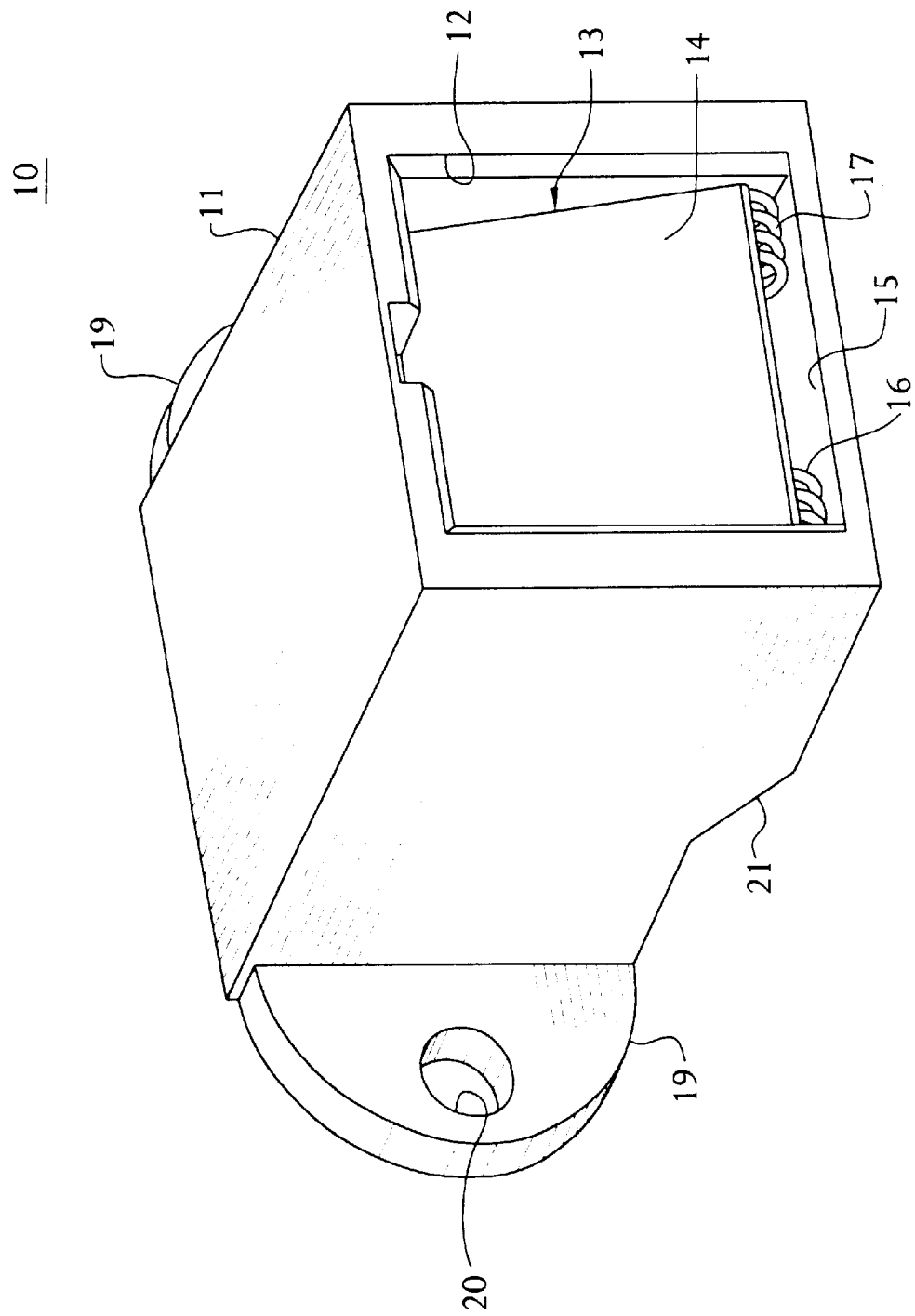
FIG. 1 is an isometric external view of a receptacle for fiber optic connectors embodying the present invention.

FIG. 1, to which reference may now be had, shows the overall receptacle 10, comprising a housing 11, open at end 12 for the insertion of an outside connector (not shown in FIG. 1). Inside the housing, adjacent to its open end 12, is shutter assembly 13. This assembly comprises a shutter plate 14, extending upwardly from the bottom 15 of housing 11, and inclined inwardly toward the interior of housing 11. Two spaced-apart coiled wire segments 16 and 17, positioned on the interior side of plate 14, are partly visible in FIG. 1. As described in more detail below, these segments support the plate 14 and also provide a hinge around which the plate can pivot. Segments 16 and 17 form two parts of a resilient member 18 (see FIG. 2) whose other parts are not visible in FIG. 1 because they are located on the interior side of plate 14. These other parts are also described in detail below.

At the end of housing 11 opposite its open end 12, brackets 19 extend from its sides and these brackets have screw holes 20 for use in attaching the receptacle at a suitable mounting location. The portion of housing 11 nearest its open end 12 has a downward extending bulge 21.

Figure 2:
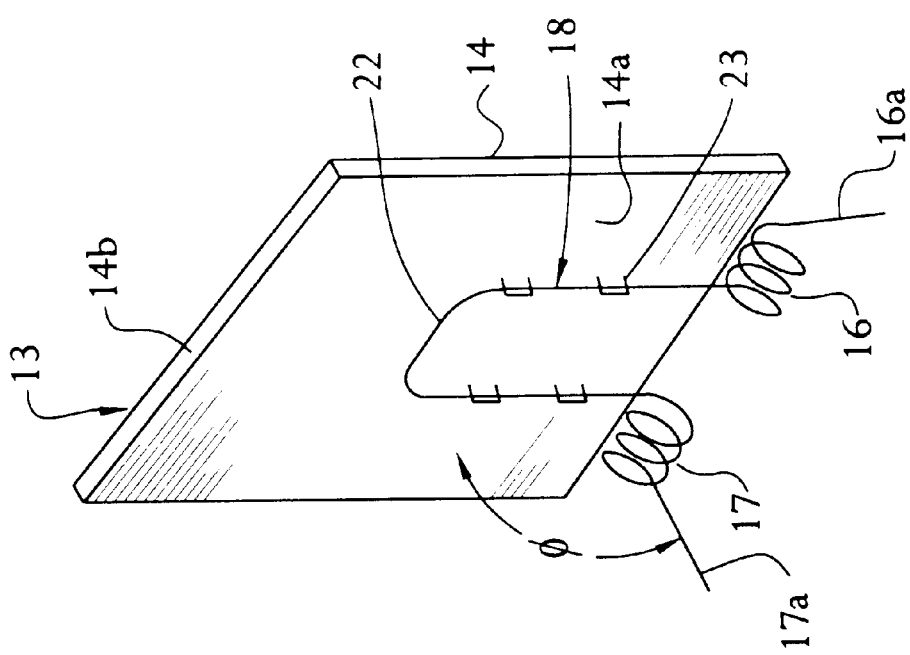
FIG. 2 is a diagrammatic illustration of a shutter plate-and-spring assembly in accordance with the invention, before it is installed in the receptacle of FIG. 1.

Turning next to the details of assembly 13, reference may now be had to FIG. 2. This shows in diagrammatic form a preferred embodiment of the shutter assembly 13, separate from and before its installation in housing 11. In FIG. 2, this assembly 13 is viewed from what would be the interior of the housing 11, after the assembly is installed in the housing. Thus "right" and "left" are reversed in FIG. 2 from what they are in FIG. 1. As shown in FIG. 2, the coiled wire segments 16 and 17 constitute parts of resilient member 18, whose center section 22 joins the two segments 16 and 17. This center section 22 takes the shape of an inverted "U" and is secured to the interior face 14a of plate 14 by stakes 23. Although not shown in the diagrammatic view of FIG. 2, this inverted-U-shaped section 22 is preferably positioned in a recess (24 in FIG. 3) in the adjoining face 14a of plate 14, so that it does not protrude from that face.

Figure 3:
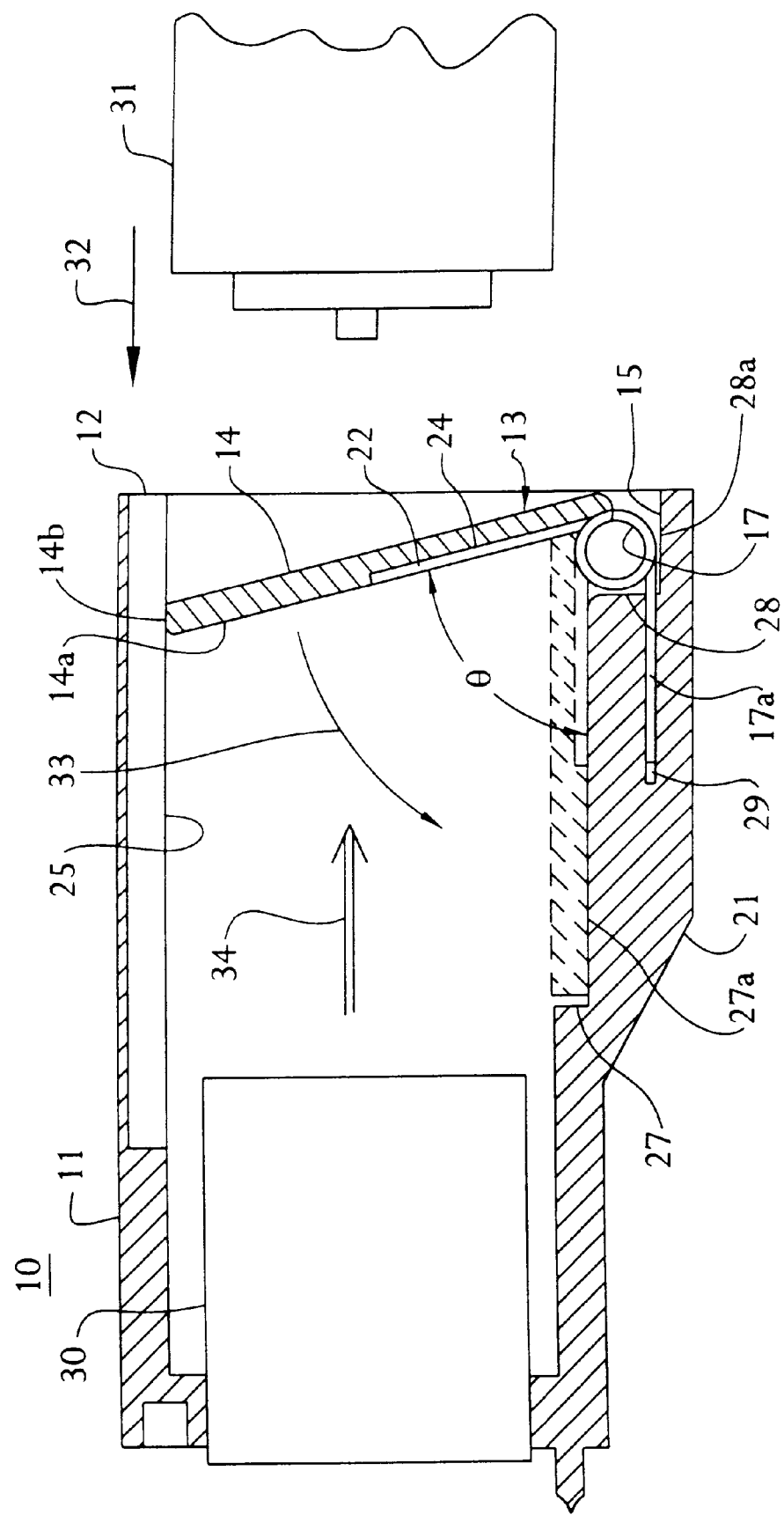
FIG. 3 is a cross-sectional view taken through plane II—II in FIG. 1.

Coiled wire segments 16, 17 terminate in end portions 16a and 17a, respectively, which are not coiled, but which are substantially straight and extend away from face 14a of plate 14. As shown in FIG. 3, when assembly 13 is installed in housing 11 and shutter plate 14 is in its closed position, an acute angle ♦ is defined between the end portions 16a, 17a and the interior face 14a of plate 14. Before being installed in the housing, the corresponding angle φ (FIG. 2) between these end positions and the shutter plate face 14a should be greater than ♦, and preferably at least 90/. When angle φ is reduced to ♦ as a result of installing assembly 13 in housing 11, a stress is induced in wire coil segments 16 and 17, which tends to restore the angle to the greater value φ. This restoring force is what urges plate 14 toward an erect position inside housing 11. In the absence of an outside connector inserted in that housing, plate 14 will therefore assume and maintain the nearly erect position shown in FIG. 3. Complete erection is prevented by the fact that the top 14b of plate 14 (see FIG. 3) contacts the ceiling (25 in FIG. 3) of the housing 11, which stops plate 14 from further erection. As shown in FIG. 2, end portions 16a and 17a are flared outwardly (i.e. away from each other). That enables them, when inserted into slot 29, to press outwardly against the adjacent end walls of the slot, thereby providing a frictional engagement with these end walls which retains the spring 18 inside housing 11 and, with it, the whole assembly 13.

Turning now to the cross-sectional view of FIG. 3, this shows—in solid lines—plate 14 positioned inside housing 11 so as to shutter its open end 12. Plate 14 is inclined inwardly because, as mentioned above, it is so dimensioned that it cannot become fully erect inside the housing.

In the bottom 15 of housing 11, there are two step-downs 27 and 28. Step-down 27 creates a recess 27a and step-down 28 creates a further recess 28a. A horizontal slot 29 formed in the riser of step-down 28 extends across housing 11 substantially over the distance by which end portions 16a and 17a (FIG. 2) are spaced apart. In FIG. 3, this means that slot 29 extends at right angles to the plane of the paper. This slot 28 is preferably laterally centered within the housing 11.

Seated in recess 28a are the wire coil segments 16 and 17 (of which only segment 17 is visible in this cross-section) and inserted into slot 29 are their end portions 16a and 17a (of which only portion 17a is visible in this cross-section).

In the end of receptacle 11 opposite 15 its end 12, there is diagrammatically represented a pre-positioned inside connector and its support structure, collectively designated by reference numeral 30 in FIG. 3.

In front of end 12, there is diagrammatically represented the forward end of an outside connector 31, before its insertion into receptacle 11 for mating with the inside connector.

Elements 30 and 31 may both take any conventional form and are therefore not further described or illustrated. For example, they may have the well-known standard SC configuration. Receptacle 10 will then be constructed and dimensioned to receive those connectors.

In use, outside connector 31 is inserted into end 12 of housing 11, as indicated by arrow 32 in FIG. 3. During this insertion, the outside connector pushes inwardly against plate 14, which respreads by pivoting downward, as indicated by curved arrow 33 in FIG. 3. If the outside connector 31, is large enough, plate 14 will ultimately reach the position shown in broken lines in FIG. 3, lying flat on the bottom in recess 27a. In the process, the wire coil segments 16a and 17a are deformed by being twisted about their axes. This deformation augments the force urging the plate 14 into its erect position which had previously been created when the assembly 13 was first installed in receptacle 10. If and when the outside connector 30 is subsequently withdrawn from the receptacle 10, this restoring force will return plate 14 to the position shown in solid lines in FIG. 3, i.e. to the position in which it shutters the end 12 of housing 11.

It will now been recognized that a light beam diagrammatically represented by arrow 34, which may be emitted from the inside connector, will be intercepted by plate 14 when and 12 is shuttered by that plate, but will not be reflected directly back to its source.

To install assembly 13, it suffices to grasp plate 14 and the end portions 16a and 17a (FIG. 2), squeeze the plate and the end portions pivotally toward each other far enough so that the whole assembly is able to fit through end 12, insert the end portions 16a and 17a into slot 29 while pushing the assembly into the housing, and finally release the grasp on the assembly. Plate 14 will then automatically assume the position shown in solid lines in FIG. 3.

Conversely, to remove assembly 13, plate 14 is pivoted downward toward end portions 16a and 17a until its upper edge clears the ceiling 25 of end 12, and is then pulled out through that end. The end portions 16a and 17a are pulled out of slot 29 by the same motion. Because these end portions are held in slot 29 only by frictional engagement, as previously explained, their removal is easily accomplished.

By making the assembly 13 laterally symmetrical, free ends 16a and 17a also contribute to centering plate 14 laterally inside the open end 12 of housing 11, so that it can readily pivot inwardly.

Figure 4:
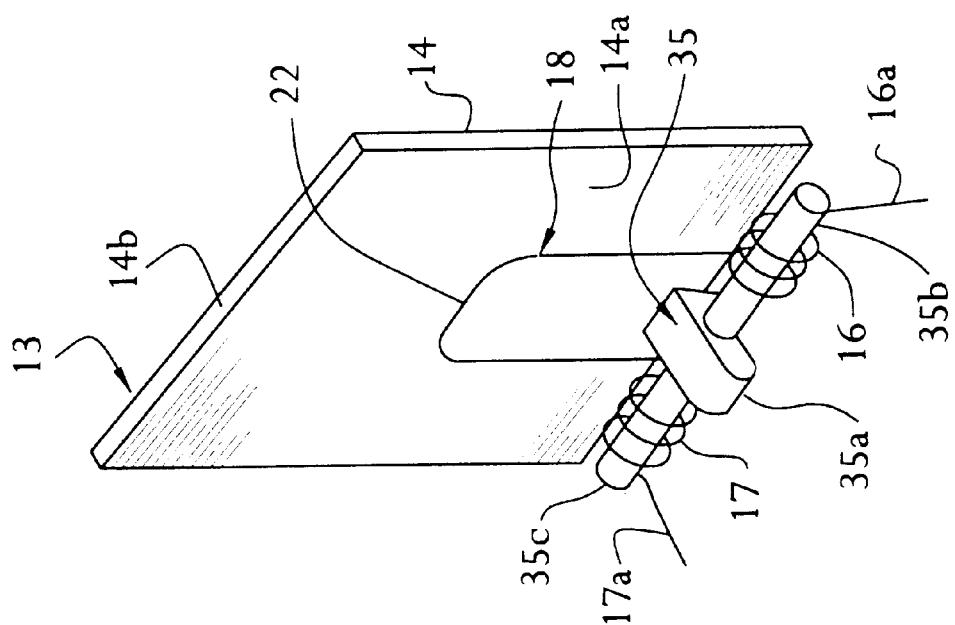
FIG. 4 is a diagrammatic illustration of an alternative embodiment of a shutter plate-and-spring assembly according to the invention, also before installation in the receptacle.

Referring now to FIG. 4, this shows an alternative embodiment of assembly 13 in accordance with the present invention. The view in FIG. 4 is from the same direction as in FIG. 3, namely from the inside of housing 11. In this embodiment, there is provided a mandrel 35 having a center portion 35a attached at the bottom end of plate 14, and having laterally projecting arms 35b and 35c spaced away from plate 14.

In this embodiment, the coiled wire segments 16 and 17 are engaged on arms 35b and 35c, respectively, while inverted-U-shaped center section 22 bridges the center portion 35a of mandrel 35. In this embodiment, stakes 23 are not needed, since the engagement with arms 35b and 35c provides adequate attachment for the entire resilient member 18. In constructing this embodiment, the arms of inverted-U 22 can simply be spread apart, far enough to slip segments 16 and 17 over their respective mandrel arms 35b and 35c, after which center section 22 is allowed to resume its initial inverted-U-shape.

In other respects, this alternative embodiment of FIG. 4 may be constructed and utilized in the same manner as that of FIG. 2.

Figure 5:
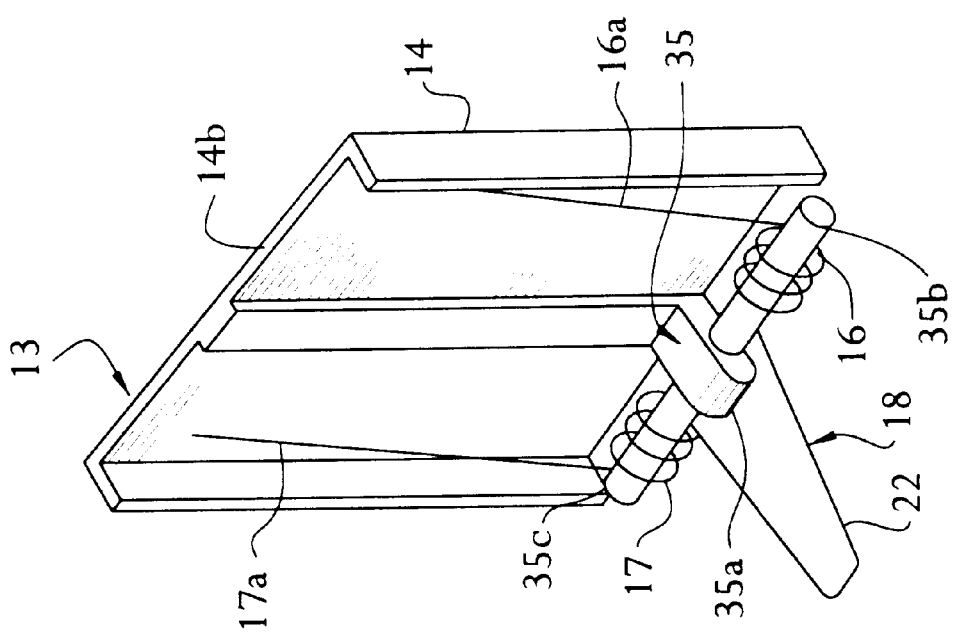
FIG. 5 is still another embodiment of such a shutter assembly.

Referring now to FIG. 5, this shows another alternative embodiment of assembly 13 in accordance with the present invention. In FIG. 5, free ends 16a and 17a, on the one hand, and U-shaped center section 22, on the other hand, are essentially reversed from FIG. 4. Free ends 16a and 17a now are adjacent to plate 14, while center section 22 extends away from plate 14 at an angle φ. Thus, it is now center section 22 which is inserted into slot 29 in housing 11. As shown in FIG. 5, section 22 tapers toward the base of the "U". Correspondingly, slot 29 must now be made narrower, so that the tapered "legs" of the "U" can frictionally engage the end walls of slot 29 and provide the required frictional retaining force for assembly 13 inside housing 11. This alternative construction may be advantageous because it is somewhat easier to grasp and squeeze together plate 14 and U-shaped section 22 for insertion into housing 11, as previously described.

It will be understood that other variations in the structure of the invention are possible without departing from the inventive concept. Therefore, it is desired that this concept be defined by the appended claims.

What is claimed is:

1. A receptacle for fiber optic cable connectors, comprising:

a housing having an open end for insertion of a said connector from outside the housing;

an assembly of a plate and a resilient means attached at an end of said plate, said assembly being positioned inside said open end, said plate being inclined inwardly with respect to said housing, thereby deforming said resilient means so that it develops a restoring force tending to erect said plate inside said housing, and said assembly being too large to enable said plate to become fully erect inside said housing.

2. The receptacle of claim 1, wherein said resilient means also provides a hinge about which said plate is adapted to pivot.

3. The receptacle of claim 1, wherein said connector is adapted to be inserted into said housing by pushing inwardly against the inclined plate, thereby pivoting it inwardly, out of the way of the connector, against the restoring force of said resilient means.

4. The receptacle of claim 3, constructed and arranged so that the plate is adapted to be pivoted enough to lie flat against the inside of the housing adjacent to the resilient means.

5. The receptacle of claim 1, wherein the resilient means is a spring.

6. The receptacle of claim 5 wherein the spring has a center portion attached to the inside of the plate, and coiled wire segments connected to opposite ends of said center portion, said segments being adapted to twist or untwist in response to pivoting of said plate, and substantially straight end portions originating at the outer ends of said segments and extending away from said plate at an angle to the plate surface.

7. The receptacle of claim 6 wherein said angle is at least 90.

8. The receptacle of claim 6 wherein said straight end portions are inserted in a slot which extends over the distance between said end portions.

9. The receptacle of claim 8 wherein at least the outermost parts of said end portions are flared away from each other, thereby frictionally engaging the end walls of said slot and retaining said assembly inside said housing.

10. The receptacle of claim 9 wherein the slot and the straight end portions are laterally centered, so that said end portions also center the plate inside said housing.

11. The receptacle of claim 5 wherein the spring has a Ushaped center portion extending away from the inside of the plate at an angle to the plate surface, and coiled wire segments connected to opposite ends of said center portion, said segments being adapted to twist or untwist in response to pivoting of said plate, and substantially straight end portions originating at the outer ends of said segments and extending adjacent to the plate surface.

12. The receptacle of claim 11 wherein said angle is at least 90.

13. The receptacle of claim 11 wherein said U-shaped center portion is inserted in a slot which extends substantially over the distance between the legs of said U.

14. The receptacle of claim 13, wherein the U-shaped portion tapers toward the bottom of the U and the slot is narrow enough so that the U-shaped portion is frictionally retained when inserted in said slot.

15. The receptacle of claim 13, wherein the slot and the spring are laterally centered with respect to the housing.

16. The receptacle of claim 1, wherein the height of said housing is insufficient to enable the plate to become fully erect inside the housing.

17. The receptacle of claim 4, wherein the floor of the housing has a recess for receiving the plate when it is pivoted inwardly sufficiently to lie flat against said floor.

18. The receptacle of claim 6, wherein the center spring portion forms an inverted U, staked to said plate inside a recess in the plate.

19. The receptacle of claim 11, wherein the coiled wire segments extend from opposite ends of said U and said straight end portions extend from opposite ends of said coiled wire segments.

20. The receptacle of claim 5, wherein said spring has spaced-apart coiled wire segments, respectively engaged on arms projecting from opposite ends of a mandrel attached to said plate.

21. An assembly of a plate and resilient means according to claim 1, for use as the shutter in a receptacle for fiber optic cable connectors.

22. The method of constructing a receptacle according to claim 1, comprising the steps of providing said assembly of plate and resilient means, squeezing said plate and resilient means together sufficiently to enable said assembly to pass through said open housing end, thereby deforming said resilient means to provide a restoring force, inserting the squeezed-together plate and resilient means into said housing through said open end, and releasing said squeezing, thereby enabling the deformed resilient means to urge said plate toward its erect position inside the housing.

23. The method of removing the assembly of claim 1 from the housing, comprising the steps of pivoting said plate inward until said assembly is able to clear the open end of said housing, and pulling said assembly out through said open end.

24. A receptacle for fiber optic cable connectors, comprising a housing having an open end for insertion of a said connector from outside the housing, characterized in that an assembly of a plate and means for engaging both said plate and said housing is positioned inside said open end, said plate is inclined inwardly with respect to said housing, and said assembly is too large to enable said plate to become fully erect inside said housing.

* * * * *